United States Patent [19]

Selbak

[11] Patent Number: 5,352,111
[45] Date of Patent: Oct. 4, 1994

[54] APPARATUS FOR REMOVING A HAND HELD FOOD PRODUCT FROM A BAKING MOLD

[75] Inventor: Will L. Selbak, Minnetonka, Minn.

[73] Assignee: Selbak's Cookie Cones, Inc., Maple Grove, Minn.

[21] Appl. No.: 83,351

[22] Filed: Jun. 28, 1993

Related U.S. Application Data

[63] Continuation-in-part of Ser. No. 630,312, Dec. 19, 1990, Pat. No. 5,223,286.

[51] Int. Cl.⁵ ............................................. A21C 15/00
[52] U.S. Cl. ..................................... 425/351; 99/383;
425/350; 425/404; 425/422; 425/437; 425/444
[58] Field of Search .................... 425/350, 351, 403.1,
425/404, 407, 422, 436 R, 437, 444; 99/383

[56] References Cited

U.S. PATENT DOCUMENTS

| | | | |
|---|---|---|---|
| 1,310,990 | 7/1919 | Hauge et al. | 425/350 |
| 1,575,301 | 3/1926 | Rach | 425/350 |
| 1,741,656 | 12/1929 | Rolker | 425/350 |
| 2,069,027 | 1/1937 | Balton | 426/391 |
| 2,404,177 | 7/1946 | Jetschmann | 426/139 |
| 3,290,154 | 12/1966 | Turner | 426/139 |
| 3,410,691 | 11/1968 | Stanley | 426/138 |
| 3,526,515 | 9/1970 | Werbin et al. | 426/139 |
| 3,541,587 | 11/1970 | Washburn et al. | 426/139 |
| 3,734,666 | 5/1973 | Guest et al. | 425/437 |
| 4,038,007 | 7/1977 | Griner et al. | 425/351 |
| 4,104,405 | 8/1078 | Forkner | 426/94 |
| 4,205,091 | 5/1980 | Van Horne | 426/139 |
| 4,303,690 | 12/1981 | Haas et al. | 426/138 |
| 4,313,964 | 2/1982 | Dembecki | 426/138 |
| 4,439,343 | 3/1984 | Albanese | 252/305 |
| 4,505,220 | 3/1985 | Bank et al. | 118/16 |
| 4,600,591 | 7/1986 | Galli | 426/139 |
| 4,749,583 | 6/1988 | Branch | 426/138 |
| 4,812,323 | 3/1989 | Savage | 426/139 |
| 4,968,240 | 11/1990 | Binacchi | 425/437 |

FOREIGN PATENT DOCUMENTS

WO80/01130 6/1980 PCT Int'l Appl. ................. 99/383

*Primary Examiner*—James Mackey
*Attorney, Agent, or Firm*—Dorsey & Whitney

[57] ABSTRACT

An apparatus for producing an edible, hand held food product which may be used as a container for ice cream and other frozen confections in which the apparatus includes, in combination, a baking mold for baking the food product and a vacuum removal plug which is selectively insertable into a female portion of the baked food product for removing the food product by means of vacuum. The removal plug has an exterior surface with a configuration corresponding substantially to the inner surface of the container and includes a plurality of vacuum ports opening to the exterior surface. The apparatus also includes a vacuum assembly for creating a vacuum within the vacuum ports.

13 Claims, 2 Drawing Sheets

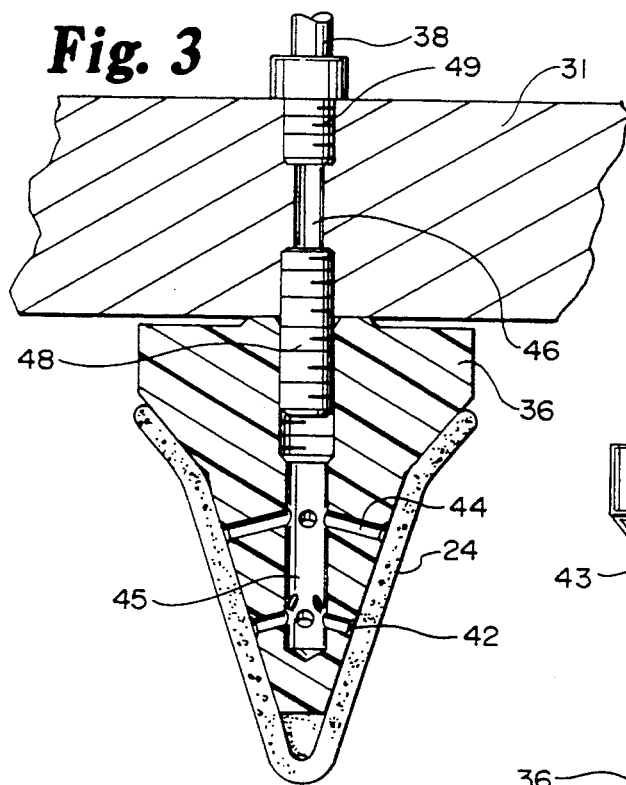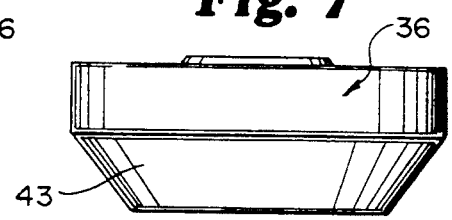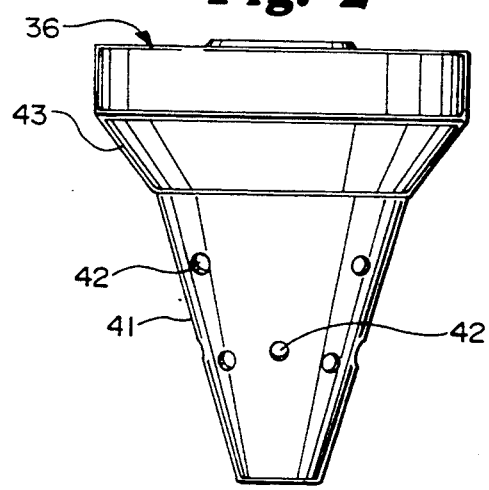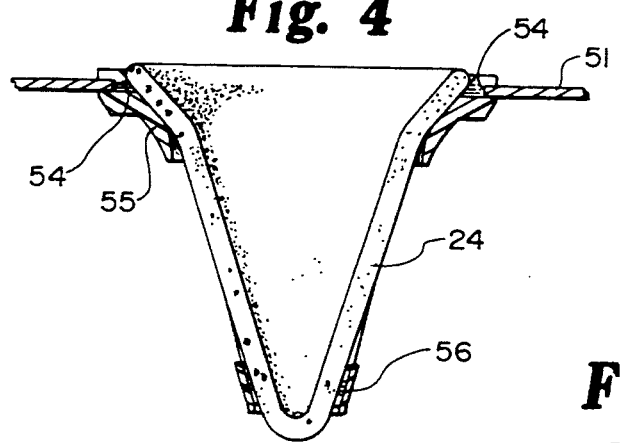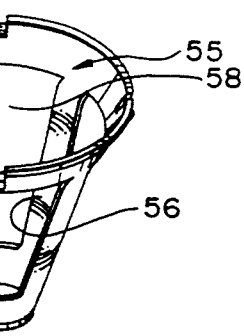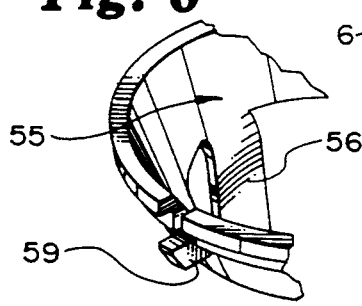

APPARATUS FOR REMOVING A HAND HELD FOOD PRODUCT FROM A BAKING MOLD

This is a continuation-in-part of U.S. patent application Ser. No. 07/630,312 filed Dec. 19, 1990, now U.S. Pat. No. 5,223,286.

BACKGROUND OF THE INVENTION

1. Field of the Invention

The present invention relates generally to an apparatus for producing an edible, hand held food product, and more particularly, to an apparatus for removing a hand-held food product made from cookie dough from a baking mold. Such product preferably has a configuration which may be used as a container for ice cream and other frozen confections.

2. Description of the Prior Art

Traditional ice cream cones, and methods and apparatus for making such cones, are well known in the prior art. There are generally two types of edible, hand held containers or cones capable of holding ice cream or other frozen confections such as frozen yogurt: wafer or cake cones, and sugar or waffle cones. Wafer or cake cones are baked in molds using what is generally referred to in the art as a "liquid" dough generally comprised of water, flour and sugar. Wafer cones are relatively thin and lightweight and are baked in the molds for a minute or two. Following baking, the bottom mold section separates, allowing the baked wafer cones to far by gravity into a collection bin where they are further collected and processed. This method of removing wafer cones from the molds is acceptable because such cones are lightweight and relatively sturdy. Accordingly, removal of the cones in this fashion results in only minimal, if any, cone breakage.

Sugar or waffle cones, on the other hand, are baked flat and then rolled into a cone shape using a dough having a relatively high sugar content. Thus, there are no molds from which the sugar or waffle cones must be removed.

According to the inventor's related application Ser. No. 07/630,312 filed Dec. 19, 1990, now U.S. Pat. No. 5,223,286 the entirety of which is incorporated herein by reference, a method and apparatus has been developed for making hand a held food product containers such as a cone shaped container made from cookie dough. Because of the thickness of these cones and their structural properties immediately following the baking step, these containers or cones cannot be removed from the molds like wafer cones by allowing them to drop by gravity into a collection bin. To do so would result in a high incidence of breakage and/or deformation of the cone configuration. This is due to the relatively soft and pliable nature of the cookie dough immediately after baking and prior to cooling. Accordingly, there is a need for an apparatus to remove the baked containers from the baking molds, and allow the same to cool, without breakage and/or deformation of the container configuration.

SUMMARY OF THE INVENTION

In contrast to the prior art, the present invention provides an apparatus for producing an edible, hand held food product such as a cone or the like made from cookie dough and which includes a mechanism for removing the baked food product from the baking molds with minimal, if any, breakage or deformation of the product configuration.

More specifically, the apparatus of the present invention includes a mold for baking the food product in which the mold includes a bottom female mold portion for receiving a measured amount of baking dough and a top male mold portion for insertion into the female portion to define a baking cavity therebetween. Such baking cavity conforms to the desired container configuration. The present invention also provides a vacuum removal plug in combination with the baking mold for removing the baked cone or food product from the baking mold. The vacuum removal plug is selectively insertable into the female portion and includes a plurality of vacuum ports which open to the exterior surface of the plug. By inserting the plug into the female portion until the exterior surface of the plug is in engagement with the inner surface of the baked food product and creating a vacuum within the vacuum ports, the baked product can be lifted out of the mold and placed in a desired position for cooling. In the preferred embodiment, a cooling conveyor is provided for this purpose. The cooling conveyor includes a plurality of cooling baskets into which the baked food product is placed.

Accordingly, it is an object of the present invention to provide an apparatus for removing a baked food product from a baking mold in a manner which minimizes, if not eliminates, breakage and/or deformation of the product during the removal process.

Another object of the present invention is to provide an apparatus for removing a baked food product made of cookie dough or the like from a baking mold.

A still further object of the present invention is to provide an apparatus for providing a vacuum food product removal mechanism used in combination with a baking mold for removing the baked product from the baking mold with minimal, if any, breakage and/or product deformation.

These and other objects of the present invention will become apparent with reference to the drawings, the description of the preferred embodiment and the appended claims.

BRIEF DESCRIPTION OF THE DRAWINGS

FIG. 2 is a front elevation view of one of the vacuum removal plugs.

FIG. 3 is a view, partially in section, of one of the vacuum removal plugs in engagement with a baked cone as viewed along the section line 3—3 of FIG. 1.

FIG. 4 is a view, partially in section, of a baked cone supported within one of the cooling baskets.

FIG. 5 is a perspective view of one of the cooling baskets.

FIG. 6 is a fragmentary detail perspective view of the encircled edge portion 5 of FIG. 4 showing the clip mechanism for connecting the cooling basket to the cooling conveyor.

FIG. 7 is a front elevational view of an alternate embodiment of a vacuum removal plus.

DESCRIPTION OF THE PREFERRED EMBODIMENT

Figure 1:
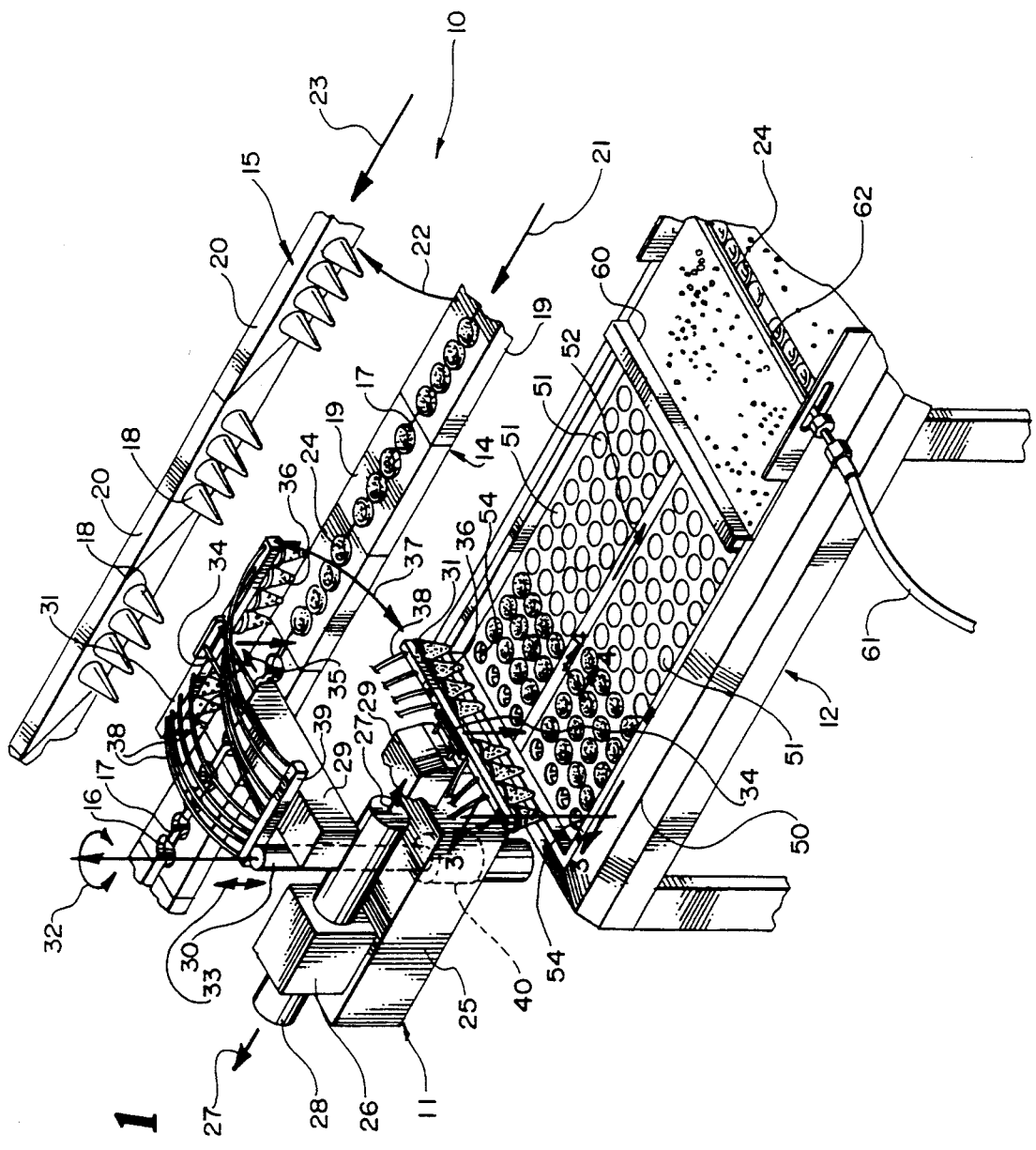
FIG. 1 is a perspective view of the apparatus of the present invention showing the baking mold mechanism, the vacuum removal mechanism and the cooling conveyor.

The present invention relates generally to an apparatus for removing a baked food product from a baking mold in a manner which minimizes, if not eliminates, breakage and/or deformation of the baked product. Although the invention has applicability to a variety of baked food products, it has particular applicability to a baked cookie dough product which is baked into the shape of a container having a configuration capable of holding ice cream or other frozen confections. More specifically, the apparatus of the present invention has applicability to an apparatus for removing a baked cone product from a baking mold in which the cone product is made from cookie dough. Accordingly, the preferred embodiment of the present invention will be described with respect to an apparatus for removing a cookie dough product from a baking mold.

With reference to claim 1, the apparatus of the present invention includes, in combination, a baking mold mechanism designated by the general reference character 10, a vacuum removal mechanism designated by the general reference character 11 and a cooling conveyor mechanism designated by the general reference character 12.

The baking mold assembly 10 includes a female baking mold assembles 14 having a plurality of mold sections 19 positioned adjacent to one another. Each of the mold sections 19 includes a plurality of female mold portions 16 which are generally conically shaped and include an inner mold surface conforming substantially to the exterior surface of the desired product configuration. Although any number of portions 16 can be included in each section 14, the preferred structure includes four portions 16 in each section 14. During operation, the female mold assembly 14 in the linear direction defined by the directional arrow 21.

In the preferred embodiment, each of the mold sections 19 is split along the split line 17 so that they are selectively separable as shown in FIG. 1. As will be described below, separation of the mold sections 19 facilitates removal of the baked cones via the vacuum removal mechanism 11.

The baking mold assembly 10 also includes a male mold assembly 15 comprising a series of adjacent male mold sections 20 adjacent to one another which correspond to and cooperate with the plurality of female mold sections 19. Each of the male mold sections 20 includes a plurality of male mold portions 18 which are insertable into a corresponding female mold portion 16 to define a baking cavity therebetween. Such baking cavity conforms to the desired container or cone configuration of the baked product.

Similar to the female mold assembly 14 the male mold assembly 15 is adapted for linear movement along the directional arrow 23 in unison with the female mold assembly 14. The male mold assembly 15 is also adapted for swinging, generally up and down movement along the directional arc 22. This enables the male mold portions 18 to be selectively inserted within the female mold portions 16 during the baking process to define the baked product configuration.

During operation of the baking mold assembly 10, a measured amount of baking dough, such as a specially formulated cookie dough, is placed in each of the female mold portions 16. The male mold portions 18 are then inserted into the portions 16 and, as a result of such insertion, the dough is spread throughout the mold cavity existing between the portions 16 and 18. With the portions 18 inserted within the portions 16, and the cookie dough positioned therebetween, the mold assemblies 14 and 15 are moved through a baking oven where the dough within the cavity is baked into the form of such cavity. Upon completion of the baking step, the male mold assembly 15 is swung upwardly and rearwardly along the arc 22 to the position illustrated in FIG. 1, thereby exposing the baked cones 24 for removal.

The vacuum removal assembly 11 includes a stationary base 25 and a movable carriage assembly 28 mounted within a carriage mounting block 26. The carriage block 26 is rigidly connected with the support base 25 while the carriage 28 is movable relative to the block in a generally forward and rearward movement along the path defined by the directional arrows 27, 27. Movable with the carriage 28 along the path 27, 27, but rotatable relative thereto, is a pivot shaft 30 which is designed for limited rotation relative to the carriage 28 in the directions defined by the directional arrow 32. The shaft 30 is also designed for vertical up and down movement relative to the carriage 28 along the path defined by the directional arrow 33. This desired rotational and vertical movement of the shaft 30 is provided by the actuator 40.

Rigidly secured near the upper end of the pivot shaft 30 is a removal plug support carriage or swing arm 29. As shown, the carriage 29 is rigidly supported relative to the support shaft 30 and is thus movable with the carriage 28 along the path 27, 27 and is rotatable and vertically moveable with the shaft 30 along the paths 32 and 33, respectively. A removal plug support bar 31 is supported at the end of the swing arm 29 by a pair of support rods 34. The support rods 34, 34 extend into the swing arm 29 and are associated with an actuation mechanism for moving the support bar 31 outwardly and inwardly relative to the end of the swing arm 29 along the path defined by the directional arrow 35.

The relative movements between the carriage 28 and the block 26, between the shaft 30 and the carriage 28 and between the support bar 31 and the carriage 29 can be provided and controlled through various motion and control components known in the art such as servo motors, rotary actuators, pistons and the like. Similarly, coordination of movement between the mold and vacuum removal assemblies 10 and 11 can be controlled by control mechanism known in the art.

The support bar 31 is disposed at generally right angles to the support rods 34, 34 and the swing arm 29 and supports a plurality of vacuum removal plugs 36. In the preferred embodiment, two sets of vacuum removal plugs 36 are supported by the bar 31 to correspond, respectively, with the two sets of four female portions 16 in the mold assembly 14. Extending from the top of the support bar 31 are a plurality of vacuum tubes 38 which extend rearwardly from the bar 31 to a vacuum tube support manifold 39. The manifold 39 is connected to a vacuum source for providing reduced pressure to the tubes 38 and thus the removal plugs 36 as will be described in greater detail below.

Reference is next made to FIG. 2 showing an elevational view of one of the vacuum removal plugs 36. Each of the plugs 36 includes an exterior surface 41. The surface 41 includes a generally conically shaped lower portion and an enlarged upper portion 43. Together, the outer surface portions 41 and 43 define a surface substantially the same size and configuration as the interior of the baked cones 24 illustrated in FIG. 3. Each of the plugs 36 includes a plurality of vacuum ports 42 opening to the exterior surface portion 41. As illustrated in FIG. 3, each of these vacuum ports 42 is connected with a vacuum bore 44 which in turn is connected with a central bore 45. The bore 45, as shown in FIG. 3, is in turn connected with the vacuum tube 38 via the bore 46. In the preferred embodiment, each of the removal plugs 36 is connected with the support bar 31 by a threaded connection element or coupling 48. The vacuum tube 38 is also connected with the support bar 31 by an appropriately threaded connection member or coupling 49.

During operation, a vacuum is formed in the vacuum tube 38, and thus at the vacuum port 42. When the plug 36 is inserted into a mold portion containing a baked cone product 24, the vacuum is applied against the inner surface of the cone 24 to lift it out of the mold assembly.

Although the preferred embodiment of the vacuum plugs 36 show a surface 41 and 43 conforming substantially to the interior configuration of the baked cone 24, it is contemplated that the plugs 36 could include an exterior surface in which only a limited surface portion conforms to the interior configuration of the cone 24. For example, as shown in FIG. 7, the plugs 36 could comprise only the surface portion 43. Such structure would be functional in accordance with the present invention provided there is sufficient vacuum and sufficient engagement between the surface 43 and the cone 24.

With reference again to FIG. 1, the cooling conveyor assembly 12 includes a support or base 50 and a conveyor section 51 which moves along the linear path defined by the directional arrow 52. The conveyor section 51 includes a plurality of openings 54 which are arranged in a grid layout to receive baked cones 24 from the vacuum removal plugs 36. Specifically, the openings 54 are aligned linearly in the direction of the conveyor movement 52 and are also aligned in a direction perpendicular to such movement. As illustrated in FIG. 4, each of the openings 54 is provided with a cooling basket 55 into which the baked cones 24 are placed. Preferably, each of the cooling baskets 55 includes a plurality of support portions 56 which define an interior configuration to support the baked cone 24. Each of the cooling baskets 55 is also provided with substantial open portions 58 to facilitate cooling of the baked cone 24. FIG. 6 illustrates a peripheral clip member 59 for connecting the cooling baskets 55 to the openings 54 in the conveyor section 51. Preferably the cooling baskets 55 are constructed from a teflon or other plastic material having self-lubricating properties to prevent the baked cone 24 from sticking to the basket 55 as it cools.

The cooling conveyor assembly 12 also includes a means 60 in the form of a dressing blade for trimming excess burrs, crumbs, and the like from the top edge of baked cones 24 and an air hose 61 for providing pressurized air to the manifold 62 for blowing crumbs, etc., from the interior portion of the baked cones 24. At this point, the baked cones 24 are ready for packaging.

Having described the structure of the apparatus of the present invention in detail, its operation can be described as follows. First, prior to movement of the various mold sections 19 and 20 past the vacuum removal assembly 11, a measured quantity of dough, such as a cookie dough, is sequentially placed into each of the female mold portions 16. The corresponding male mold section 20 is then lowered so that the male mold portions 18 are inserted into the portions 16. This causes the cookie dough to spread uniformly throughout the cavity formed between the two mold portions 16 and 18. The mold sections 19 and 20 are then passed through a baking oven where the cookie dough within the baking cavity is baked. Various processes exist for ensuring high quality baking of the dough. In some processes, the mold assemblies 20 are raised slightly during baking to release water vapor and other gases generated as a result of the baking process. Further, it is common for the mold portions 16 and 18 to be preheated and in some cases, the mold portion 18 to be heated to a temperature greater than that of the mold portion 16. Further details of such baking are provided in the inventor's related application Ser. No. 07/630,312 filed Dec. 19, 1990, now U.S. Pat. No. 5,223,286.

After the baking process, the male mold assemblies 20 are withdrawn from the female mold assemblies 19 as shown in FIG. 1. At this point, the baked cones 24 are positioned within the female mold portions 16.

To remove the baked cones 24 from the portions 16, the carriage 28 is moved forwardly (toward the right in FIG. 1) and the support bar 31 is moved outwardly to a position where the cone removal plugs 36 on the bar 31 are directly above corresponding baked cones 24 in the mold portions 16. The swing arm 29 is then lowered, so that the removal plugs 36 are inserted into the baked cones 24. During this insertion, the swing arm 29, together with the pivot shaft 30 and the carriage 28, move rearwardly in the direction of the arrow 27 at the same speed as the movement of the mold assemblies 19 in the direction of the arrow 21.

When the removal plugs 36 are fully inserted into a corresponding baked cone 24, the vacuum in the vacuum tubes 38 is activated and the mold halves of the mold assemblies 19 separate along the split 17 to release the cones 24. The arm 29 is then raised to remove the cones 24 from the mold portion 16 and is swung in the direction of the arrow 37 to the position illustrated in FIG. 1 in which the support bar 31 is positioned above the conveyor assembly 12, and specifically the cooling baskets 55. The arm 29 is then lowered so that the baked cones are placed within the cooling baskets 55. During this placement, the arm 29, together with the carriage 28, move forwardly in the direction of the arrow 27 at the same speed as the conveyor section 51. When the cones have been positioned within the cooling baskets 55, the vacuum in the tubes 38 is released and the removal plugs 36 are withdrawn from the cones. The cycle then repeats itself.

Although the description of the preferred embodiment has been quite specific, it is contemplated that various modifications could be made without deviating from the spirit of the present invention. Accordingly, it is intended that the scope of the present invention by dictated by the appended claims rather than by the description of the preferred embodiment.

I claim:

1. An apparatus for producing an edible, hand held food product having a configuration that may be used as a container for ice cream and other frozen confections, said container configuration having an outer surface and a spaced inner surface, said apparatus comprising:

a mold for baking said food product, said mold including a female portion and a male portion for insertion into said female portion to define a cavity therebetween conforming to the desired container configuration, said male portion being selectively moveable into and out of said female portion;

a vacuum removal plug selectively insertable into said female portion for removing said baked food product, said removal plug having an exterior surface with an exterior surface portion having a configuration corresponding substantially to a portion of the inner surface of said container configuration and including a plurality of vacuum ports opening to said exterior surface;

vacuum means for selectively creating a vacuum within said vacuum ports to facilitate removal of said baked food product from said female portion; and a cooling conveyor having at least one cooling basket for receiving said baked food product, said cooling basket having an interior configuration corresponding substantially to at least a portion of the outer surface of said container and having a plurality of cooling openings.

2. The apparatus of claim 1 wherein said at least one cooling basket has an interior configuration corresponding substantially to the outer surface of said container configuration.

3. The apparatus of claim 1 including means for selectively moving said vacuum removal plug from a first position inserted within said female portion to a second position inserted within said cooling basket.

4. The apparatus of claim 3 including vacuum control means for selectively creating a vacuum within and removing a vacuum from said vacuum ports.

5. The apparatus of claim 3 including a plurality of adjacent removal plugs moveable in unison between a first position inserted within a corresponding female portion and a second position inserted within a corresponding cooling basket.

6. The apparatus of claim 1 including means for moving said female and male portions along a first linear path.

7. The apparatus of claim 6 wherein said conveyor is moveable along a second linear path opposite to said first linear path.

8. The apparatus of claim 7 including means for selectively moving said vacuum removal plug from a first position inserted within said female portion to a second position inserted within said cooling basket.

9. The apparatus of claim 8 wherein said means for moving said vacuum removal plug includes a swing arm selectively pivotable about an axis orthogonal relative to said first and second linear paths.

10. The apparatus of claim 9 including vacuum control means for selectively creating a vacuum within and removing a vacuum from said vacuum ports.

11. The apparatus of claim 10 including a plurality of molds, each having a female portion and a male portion, a plurality of vacuum removal plugs and a plurality of cooling baskets.

12. The apparatus of claim 1 wherein said vacuum removal plug is selectively moveable between a removal position in which said plug is inserted into said female portion and a release position in which said plug is at least partially inserted into said cooling basket.

13. The apparatus of claim 12 including means for moving said vacuum removal plug from said removal position to said release position and from said release position to said removal position.

* * * * *